D. C. HUGHES.
AUTOMATIC FEEDER FOR ADDRESSING MACHINES AND THE LIKE.
APPLICATION FILED JULY 26, 1910.

1,209,411.

Patented Dec. 19, 1916.
9 SHEETS—SHEET 1.

D. C. HUGHES.
AUTOMATIC FEEDER FOR ADDRESSING MACHINES AND THE LIKE.
APPLICATION FILED JULY 26, 1910.

1,209,411.

Patented Dec. 19, 1916.
9 SHEETS—SHEET 2.

Witnesses:

Inventor:
Davydd C. Hughes

D. C. HUGHES.
AUTOMATIC FEEDER FOR ADDRESSING MACHINES AND THE LIKE.
APPLICATION FILED JULY 26, 1910.

1,209,411.

Patented Dec. 19, 1916.
9 SHEETS—SHEET 3.

D. C. HUGHES.
AUTOMATIC FEEDER FOR ADDRESSING MACHINES AND THE LIKE.
APPLICATION FILED JULY 26, 1910.

1,209,411.

Patented Dec. 19, 1916.
9 SHEETS—SHEET 8.

Witnesses:

Inventor:
Davydd C. Hughes
By 
Atty.

UNITED STATES PATENT OFFICE.

DAVYDD C. HUGHES, OF CHICAGO, ILLINOIS, ASSIGNOR, BY MESNE ASSIGNMENTS, TO ADDRESSOGRAPH COMPANY, OF CHICAGO, ILLINOIS, A CORPORATION OF ILLINOIS.

AUTOMATIC FEEDER FOR ADDRESSING-MACHINES AND THE LIKE.

1,209,411.  Specification of Letters Patent.  Patented Dec. 19, 1916.

Application filed July 26, 1910. Serial No. 574,005.

*To all whom it may concern:*

Be it known that I, DAVYDD C. HUGHES, a citizen of the United States, and a resident of Chicago, Cook county, Illinois, have invented certain new and useful Improvements in Automatic Feeders for Addressing-Machines and the like, of which the following is a full, clear, and exact description, such as will enable others skilled in the art to make and use the same.

My invention relates to printing machines and has particular reference to printing machines in which unit type holders or type plates and pieces of printable material are periodically carried to the printing position of the machine to make an impression upon the printable material.

One of the objects of my invention is to provide a printing machine of this character which will have means for holding the type holders and material, and which will have means for transferring the type holders and printable material from their respective holders to the printing position to make an impression on said material and which will discharge the material and re-stack the type holders after the printing operation has been performed; which will have all of its parts and coöperating mechanisms mounted in a suitable frame and properly related to perform their various functions; which will be simple, compact, durable and reliable, consistently with the requirements of a machine of this character and of the work which it is to perform, and which may either be operated manually or mechanically.

A further and more particular object of my invention contemplates the provision of a mechanism for feeding printable material, wherein may be placed a supply of material and which mechanism will automatically withdraw or extract pieces of said material and transfer them to the printing mechanism of the machine in proper order and in time for the printing operation; which will initially advance the next piece of material in the supply while the preceding piece is in transit, which will have means for withholding said next piece of material until time for the next printing operation, and which may be quickly and accurately adjusted throughout its various parts to render the machine adaptable to a wide range of work.

Referring now to the accompanying drawings, I will describe the structure which has been particularly designed to carry out the various objects which I have outlined above.

The machine which I have depicted in the drawings, is particularly designed for operation in connection with the individual type holders or type carriers which are component parts of the "Rogers" system, and while the various parts and co-acting mechanisms are capable, with suitable modification, of carrying out the function of my invention in other machines, I have chosen to illustrate them as co-related in a complete operative machine of the class used in the "Rogers" system.

In order to present a clear understanding of this machine which performs the functions of my invention, I think it as advisable to describe the various mechanisms and their relations to each other in the following order: The framework which provides a suitable foundation for maintaining the various co-acting mechanisms in their operative relation. The type holder or type plate magazine which is provided for holding the type holders in position to be withdrawn by the conveyer. The type holder conveyer by which the individual type holders are taken from the magazine and carried to the printing mechanism. The printing mechanism through which the type holders and pieces of printable material are passed, and which presses them into engagement to make an impression on said material. The receptacle for discharged type holders into which the type holders are discharged from the machine. The pusher or re-stacker mechanism by which the forward end of the drawer is cleared of type holders and by which the type holders are re-stacked. The inking mechanism by which the necessary ink is supplied for making an impression upon the printable material. The paper holder which forms a suitable container for the printable material. The paper feed by which pieces of printable material are automatically fed to the printing mechanism.

*The framework.*—The framework of the machine constitutes a suitable foundation or support in which all of the mechanisms are mounted and maintained in their proper relation to each other. This framework comprises side members 1 arranged in vertical parallel relation and suitably braced to form a rigid structure. These side members are formed of a suitable shape to accommodate the various operating mechanisms as shown in the drawings. At the rear of the framework is a magazine in which the type holders or type plates are stacked up and held in position to be removed by the conveyer mechanism which is located and operable directly below the stack of plates in the magazine. In the forward portion of the framework is the printing mechanism by means of which type holders and pieces of paper or printable material are pressed into printing engagement. In the upper portion of the framework and at the intake side of the printing mechanism is the magazine or holder for printable material and the feed mechanism which operates to withdraw the printable material from the magazine and present it to the printing mechanism. Intermediate the type holder magazine and the printing mechanism and located at the upper portion of the framework is the ribbon inking mechanism for furnishing the necessary ink to the type holders as they are passed through the printing mechanism, and extending or projecting from the forward end of the framework is the take-up roll which forms a part of the inking mechanism. A drawer or receptacle is disposed throughout substantially the lower portion of the framework and is arranged in position to receive the type holders as they are discharged from the printing mechanism, and operatively arranged in the forward end of the framework below the printing mechanism is a pusher or re-stacker mechanism which is adapted to clear the front portion of the drawer to constantly provide room in which the discharged type holders may drop and to re-stack the type holders in the drawer.

Figure 8:
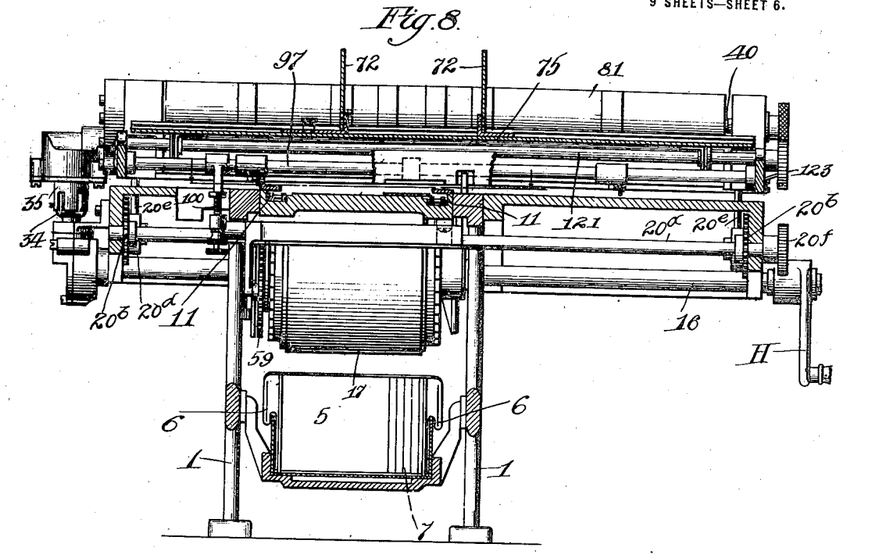
Fig. 8 is a vertical sectional view taken on line 8—8 of Fig. 1.

*The type holder or type plate magazine.*—Disposed at the rear end of the framework and extending vertically upward therefrom is positioned the magazine in which a stack or pile of individual type holders 5 are placed. These type holders or type plates are of a kind which form a component part of the "Rogers" system. By reference to Figs. 2 and 8 it will be readily seen that they comprise metallic sheets provided with laterally and downwardly extending lugs 6 on the side edges thereof and with suitable type slots or channels 7 on their upper faces, in which slots are contained the type characters which represent a name, address or other printing subject matter. They are also provided with two comparatively deep ribs on their under faces the purpose of which is to guide the plates through the machine and to space the type holders in the magazine and in their containing receptacles. The magazine comprises two vertically disposed, parallel plates 8 on the forward edges of which are flanges 9 hinged to move outwardly and operated by the thumb lever 10. These flanges embrace the sides of the stack and engage the lugs 6 on the edges of the type holders to maintain the type holders in proper stacked order. The lower end of the stack in the magazine rests upon a guide plate or bed disposed along the upper portion of the framework, the lowermost type holder being in position to be removed from the stack and carried forward by the conveyer into the printing position of the machine.

Figure 6:
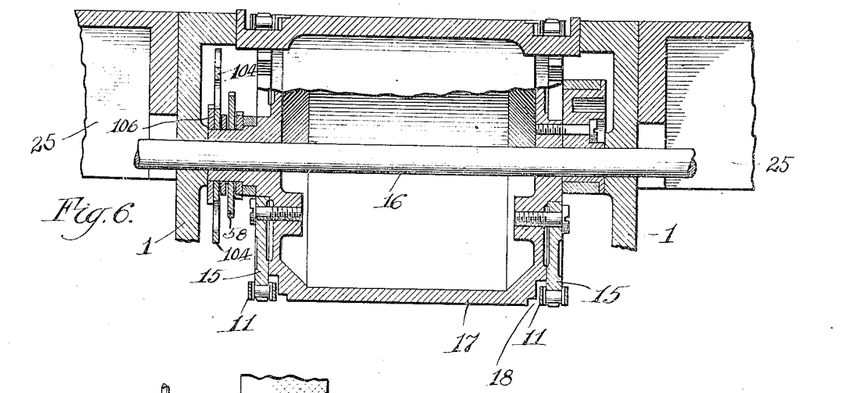
Fig. 6 is a sectional view of a portion of the drum mechanism taken on line 6—6 of Fig. 5.

*The type-holder conveyer.*—The type-holder conveyer consists of a pair of endless chains or belts 11 arranged to travel between and along the upper edges of the side members 1 of the framework, these chains being provided at intervals with lugs 11' (see Fig. 6) for engaging the lowermost type-holder in the magazine and carrying it to the printing mechanism. Each chain is carried upon a pair of sprocket wheels positioned at the rear and forward ends of the framework respectively. The rear sprocket wheels 12 are mounted upon a shaft 13 journaled in bearing blocks slidably mounted in slots 14 in the frame members 1 for the purpose of tightening or loosening the conveyer chains as occasion requires, and the forward sprocket wheels 15 are carried upon a shaft 16 journaled in suitable bearings in the forward end of the framework. The forward sprockets are mounted upon the same shaft as the large rotary drum or roller of the printing mechanism, as will be hereinafter described. The machine may be operated mechanically or manually at the option of the user. A handle crank H is mounted upon the forward shaft 16 for operating the conveyer and the rest of the mechanism manually. Associated with the rear shaft is an electric motor and driving mechanism which furnishes a means of mechanically operating the mechanism. Both means of driving the machine are associated with their respective shafts in such a manner that when one of them is being used the other is not disturbed.

Figure 7:
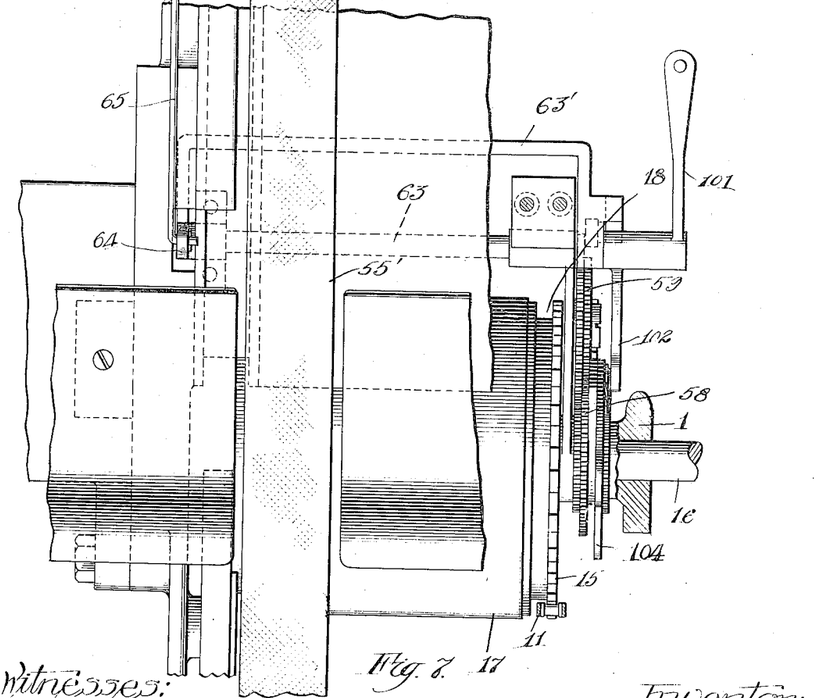
Fig. 7 is a partial top plan view of the printing mechanism, the upper carriage being removed.

*The printing mechanism.*—The printing mechanism is the mechanism by which a type-holder and a piece of paper are pressed into printing engagement so that the type-holder will make an imprint upon the sheet of paper or printable surface, this imprint, of course, being in accordance with the subject matter for which the type are set up. It comprises essentially a large, rotary drum or cylinder and a smaller pressure roll. The rotary drum 17 is mounted between the two forward conveyer sprocket wheels 15 upon the shaft 16 thereof. It is preferably hollow and of such diameter that the under faces of the type holders which are brought forward by the conveyer mechanism engage the surface of the drum. The drum is reduced somewhat in diameter at each end to provide runways 18 for the conveyer chains 11 and for accommodating the spacing flanges on the under faces of the type-holders, as clearly shown in Fig. 7. The rotary drum receives its motion through the medium of the conveyer chains 11 when the conveyer is driven mechanically and by the shaft 16 when operated manually since the drum and the forward sprockets 15 are rigidly mounted upon the shaft 16. Associated with the said shaft are various cams and gear mechanisms through the medium of which power is transmitted to the pressure roll of the printing mechanism and to the several co-acting parts of the paper feed mechanism.

Figure 1:
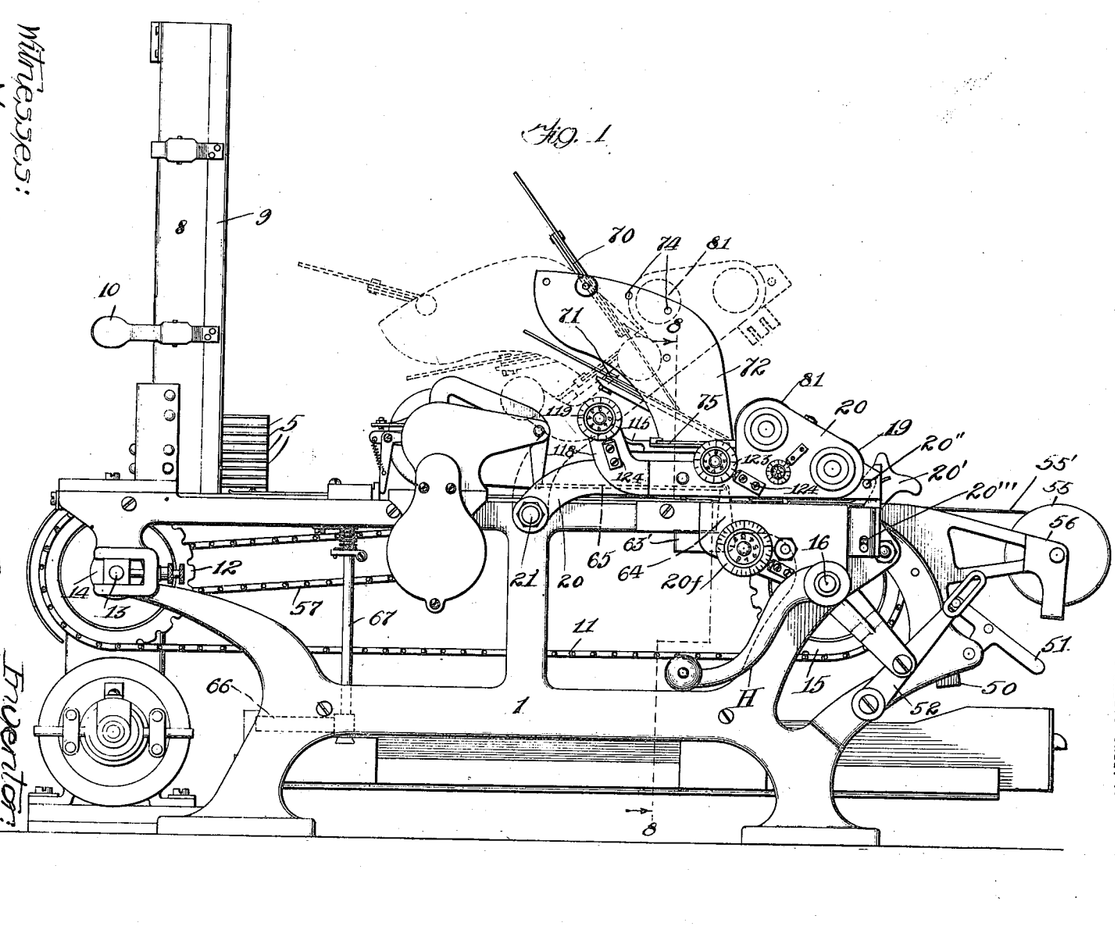
Figure 1 is a side elevation of a printing machine showing the various mechanisms in their operative relation.
Figure 10:
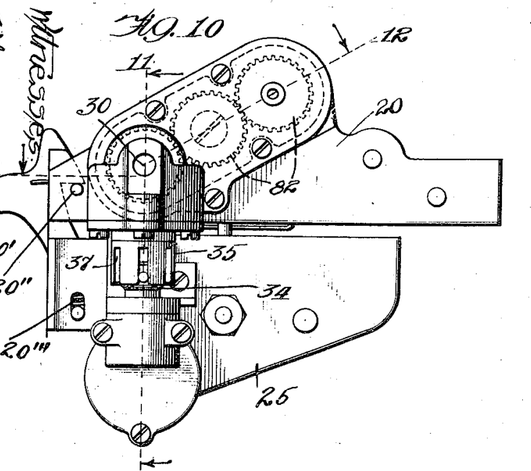
Fig. 10 is an enlarged fragmentary view of the left hand end of the upper portion of the structure shown in Fig. 2, this view showing the separable connection between the carriage and the frame.

The pressure roll 19 is positioned above the rotary drum with its axis of rotation parallel thereto. This pressure roll coöperates with the rotary drum of the printing mechanism to exert a pressure upon the type holders and pieces of paper or printable material as they are passed therebetween. It is rotatably mounted on the forward end of a swinging carriage frame 20 which bridges the upper forward end of the main framework and which is pivoted at 21 to the side members 1 thereof, thereby permitting the pressure roll to be lifted or raised up clear out of the way of the rotary drum. In other words, it allows a wide separation of the two rolls of the printing mechanism, the advantage of which is at once apparent. It is essential in a machine of this character that there be a relative adjustment of the drum and pressure roll of the printing mechanism so that the space therebetween may be varied to adapt the printing mechanism to various thicknesses of paper, since if this space were fixed the machine would be limited or restricted in its operation to a given thickness of paper. It is furthermore desirable that this roll should exert a pressure upon the type-holder and piece of material as they pass therebetween and that this pressure shall be variable in order to govern the impression made upon said material, so that the printing mechanism, having been once adjusted to suit the requirements of the particular characteristics of the material which is being operated upon, will maintain a uniform pressure upon that particular material. The result will naturally be a uniform printed impression of the shade for which the mechanism is adjusted. The advantage then is at once seen of mounting the pressure roll on the carriage, such as indicated by 20 in the drawings, because this carriage may then be adjusted up or down to vary said space. I have therefore provided one means for adjusting the upper pressure roll. This means comprises a set of jack pins 20$^e$ operated by gear driven cams 20$^d$. A suitable shaft 20$^a$ extends between and is journaled in bearings in the upper portion of the main framework. It carries near its ends a pair of pinions 20$^b$ each of which meshes with a partially toothed gear 20$^c$ mounted upon short stud shafts on each side of the frame. Associated with each gear 20$^c$ is one of the cams 20$^d$ which, when rotated by the gear mechanism, operate to raise and lower pins 20$^e$ projecting upwardly through the frame of the machine in position to engage with the under side of the forward end of the carriage frame 20, as clearly seen in Figs. 4 and 19. One end of the shaft 20$^a$ has a graduated, knurled thumb-knot 20$^f$ (Fig. 1) by which the shaft may be turned and which serves as a dial to indicate the amount of adjustment. Stop pins 20$^g$ are arranged on the gears 20$^c$ to limit the range of adjustment. The carriage is locked in position by two spring-pressed finger hooks 20' which engage short rods 20'' carried at the end of the carriage frame. (See Figs. 2 and 10.) These spring hooks are anchored in the frame of the machine by means of springs 20'''. The spring hooks thus permit the carriage to be adjusted through the agency of the adjustment mechanism just described and at the same time lock the carriage firmly in its adjusted position.

Figure 11:
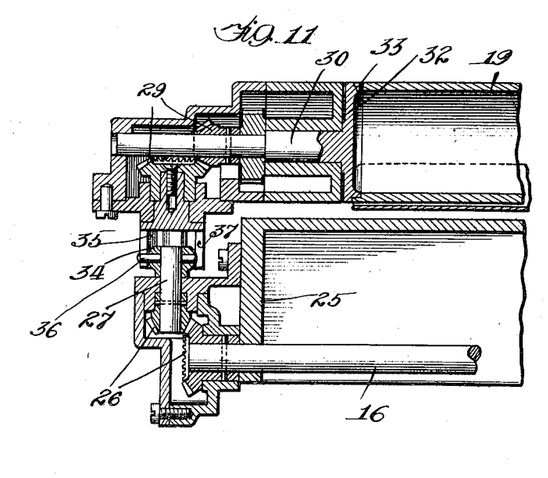
Fig. 11 is a sectional view on line 11—11 of Fig. 10.
Figure 12:
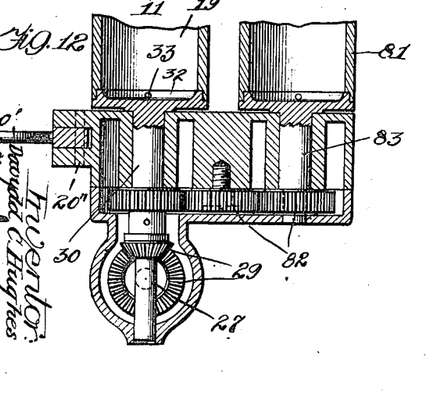
Fig. 12 is a sectional view on line 12—12 of Fig. 10.

It is necessary that there be no relative difference in the peripheral speed of the pressure roll and the rotary drum below it so as not to smudge or blur the impression made upon the paper. By reference to Figs. 10, 11 and 12 it will be seen that the pressure roll 19 is driven from the rotary drum through the agency of a suitable train of gears together with a dental clutch or universal coupling interposed in said gear train to permit the pressure roll to be raised up clear of the rotary drum when the carriage, upon which it is rotatably mounted, is swung about its pivots 21, as shown in dotted lines in Fig. 1. The end of the drum shaft 16 is extended laterally for some distance and has a journal in a lateral extension 25 of the machine frame. This shaft drives through intermeshing bevel gears 26, a short, vertical shaft 27, and the upper end of the short shaft drives, through the medium of intermeshing bevel gears 29, a horizontally disposed shaft 30 for rotating the pressure roll, this shaft being journaled in suitable bearings provided therefor in the carriage frame. From Figs. 10, 11, and 12 it will be seen that all of these gears are inclosed in a casing which may be packed with a lubricant so as to keep the gears running smoothly and which protects the gears and shafts against damage and against the entrance of grit or dust. The inner end of the shaft 30 carries a disk or head 32 of substantially the diameter of the pressure roll 19, this head being suitably shouldered to fit within the end of said roll so as to provide a separable connection between the roll and its driving shaft 30, thereby permitting the removal of the roll from the carriage when desired. The head 32 has pins 33 which engage corresponding slots in the ends of the roll so as to prevent slippage or relative movement of the roll and head. The shaft 27 is divided, but operatively connected by means of a dental or ball and socket clutch, the ball member 34 of which is attached to the lower portion of the shaft and fits within the socket member 35 carried by the upper portion of the shaft. The ball member has a transverse pin 36 which engages and operates in open slots 37 in the socket member, thereby providing a separable driving connection between the two portions of the shaft. This clutch is located at substantially the dividing line between the frame of the machine and carriage upon which the pressure roll is mounted and permits the carriage to be raised, as shown in dotted lines in Fig. 1.

Figure 9:
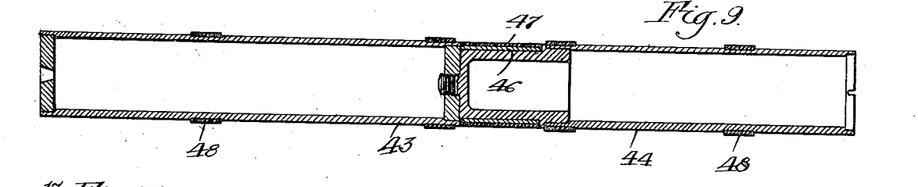
Fig. 9 is an enlarged longitudinal section of the pressure roll of the printing mechanism.

The driving mechanism which I have just described is so proportioned that it imparts to the pressure roll a peripheral speed the same as that of the rotary drum below it. This train of gears is continued on through the casing on the carriage for the purpose of driving the feed roll the function of which will be described later. The other end of the pressure roll is held in place in the carriage by means of a center pin 40 mounted to reciprocate in a bearing in the end of the carriage frame 20 but constantly pressed into engagement with the end of the roll by a spring 41. The pin is provided on its projecting end with a head 42 by which it may be grasped and the pin withdrawn when it is desired to remove the roll from the carriage. The roll itself is shown in Fig. 9. It comprises two tubular sections 43 and 44 placed end to end in longitudinal alinement and rigidly secured together by a screw projection 45 carried by the section 44 which screws into a tapped hole in the abutting head of the section 43. The end portion of the section 44 which lies adjacent the joint between the two sections is reduced somewhat in diameter and is provided with a removable sleeve 46 which fits thereon reasonably tight and is clamped in place between the head of section 43 and the shoulder formed by the reduced portion of section 44. This sleeve has surrounding it a layer 47 of yielding substance such as partially hardened rubber secured preferably by coating the sleeve with rubber and vulcanizing the rubber. This arrangement provides a suitable platen for the printing mechanism which is essential to the production of a proper imprint upon the paper. This platen portion of the roll is placed on the roll in such a position that the type holders and paper as they pass through the printing mechanism, will be pressed between the rotary drum and the rubber surface of the pressure roll. It will be understood, however, that this platen may be made of any desirable length; it may extend the entire length of the roll if necessary. It is desirable that the roll be so constructed as to frictionally engage the paper to carry it through the printing position. I have therefore provided the roll with a number of frictional surfaces, such as rubber bands 48 spaced at intervals along its length.

It is quite desirable that a machine of this character shall be adjustable to various lengths of paper so that it will have a wide range of usefulness. I therefore make the pressure roll considerably longer than the rotary drum so that it will accommodate letter-heads bills, envelops and the like, although the drum may be of the same length as the pressure roll, if desired.

*The receptacle or drawer for discharged type holders.*—After the type holders have performed their printing operation and have passed the printing position they are discharged downwardly through a chute or outlet 50 which is arranged between the side members of the frame in the forward portion thereof. Disposed horizontally throughout substantially the lower portion of the frame is a comparatively long drawer or receptacle removably held in place in a suitable bed which is supported by and between the side members of the frame. The forward end of the drawer lies below the mouth of the chute in position to receive the discharged type holders therefrom. The type holders drop into the drawer in a substantially vertical position and the lugs 6 of the side edges thereof overhang the edges of the drawer in order to support them in position.

*The pusher or re-stacker mechanism.*—This is a mechanism operable after each plate falls into the drawer for pushing the plate toward the rear end of the drawer in order to maintain the forward end clear so that the next plate will have a clear space in which to fall. This mechanism comprises two bell crank levers 51 (seen in Fig. 1) pivoted to the side members of the frame and arranged to swing downwardly and rearwardly adjacent the outer side faces of the drawer and to engage with the lugs 6 on the type holders to push the type holders back toward the rear of the drawer. The bell crank levers 51 are operated through a system of levers 52 which have an eccentric connection with and receive their movement from the shaft 16 and said levers 51 are arranged to engage each type holder after it lands in the drawer and push it backward. In this manner the type holders as they are received from the printing mechanism are re-stacked in the drawer in the same relative order in which they were removed from the stack in the magazine. After a drawer has been filled it may be removed from the machine and placed in a cabinet.

*The inking mechanism.*—The type which are employed in the type holders are metallic and resemble the type used in an ordinary typewriter so far as the impression they make is concerned. Some method of supplying ink to these type is necessary so that they shall make their impression on the paper. In this machine which I have shown in the drawings this supply of ink is furnished by an inked ribbon which is interposed between the type holders and the pieces of paper which are passed into printing position therewith between the rolls of the printing mechanism. On account of this ribbon being interposed in this manner it must necessarily move with the paper and type holder and at the same speed in order not to tear the ribbon or to smudge or blur the impression, and mechanism must, therefore, be provided which will be timed to properly advance the ribbon during the printing operation. I have indicated such an inking mechanism in Figs. 1 and 2. It comprises a "pay-out" reel or holder 53 located at the "intake" side of the printing mechanism, and a spring actuated "take-up" reel or holder 55 mounted on extensions 56 disposed on the forward end of the frame at the discharge side of the printing mechanism. The ribbon 55′ is stretched between these two reels and is somewhat above the path of the type holder. Suitable gear mechanism, driven by means of the chain 57 extending from the rear shaft 13, is provided for advancing the ribbon substantially the length of a type holder at timed intervals. The timing of the advance of the ribbon is controlled through a system of gears, cams and levers which receive their movement from the rotary drum shaft 16.

Figures 4, 5, 18, 19:
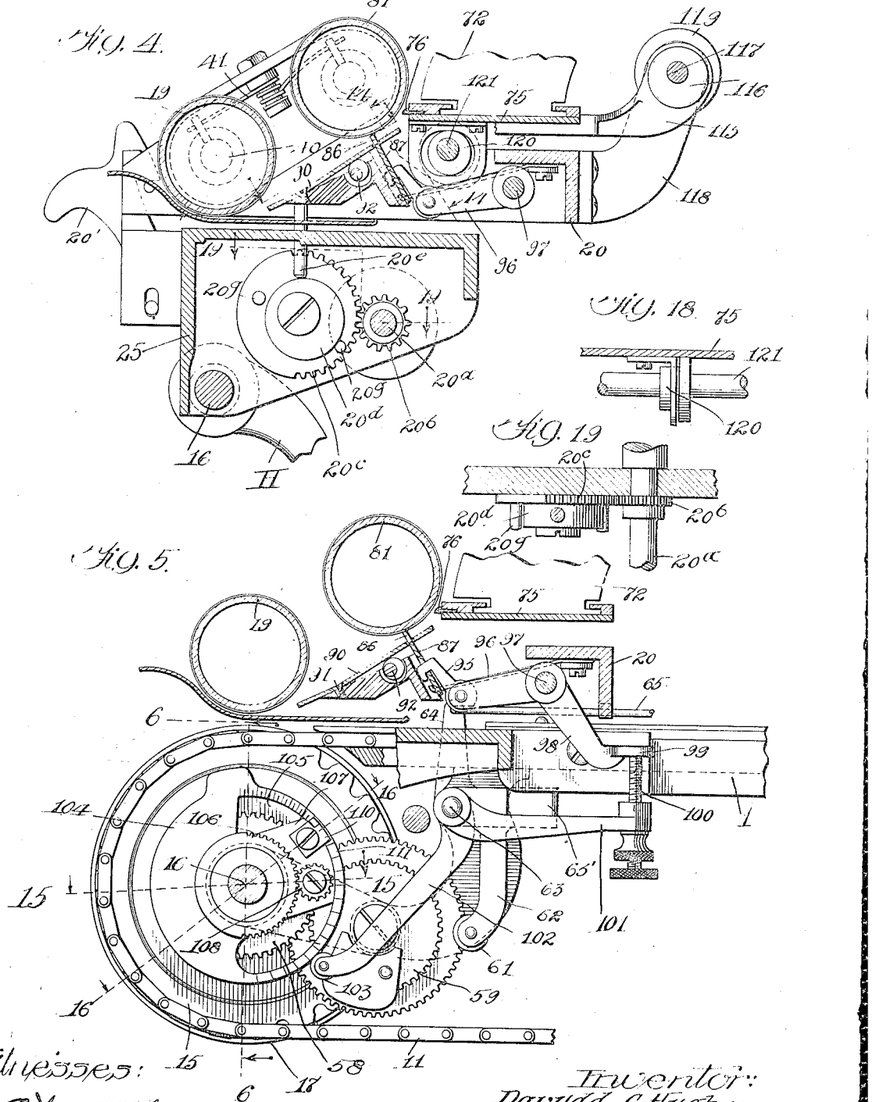
Fig. 4 is a sectional view on line 4—4 of Fig. 2.
Fig. 5 is a sectional view on line 5—5 of Fig. 2.
Fig. 18 is a detail view of the cam for adjusting the feed ledge with respect to the roller.
Fig. 19 is a detail sectional view on line 19—19 of Fig. 4.

Referring now to Fig. 5 it will be seen that the spur gear wheel 58 which is associated with the shaft 16 meshes with and drives a corresponding gear 59 which carries an adjustable cam, the ratio of these gears being such that the cam will engage a roller 61 carried upon a downwardly extending lever 62 each time a type plate arrives at the printing position. This lever is carried upon a bail 63′ pivoted on shaft 63 and bridging the side members of the frame. On the opposite side of the frame the bail carries an upstanding arm 64 which is connected by a link 65 to the "pay-out" reel operating mechanism. As the ribbon is paid out, it is automatically taken up by the forward spring actuated reel 55 until substantially the total length of ribbon has been transferred from the one reel to the other. The total length of ribbon is preferably sufficient for a drawer full of type plates. A spring is associated with the "pay-out" reel for re-transferring the ribbon to said reel, the action of this spring being controlled by the removal of the drawer through the agency of a lever 66 carried upon a vertical shaft 67.

*The paper holder.*—While it would be possible in the machine which I have shown to feed the paper or other printable material to the printing mechanism by hand it is highly desirable from the standpoint of speed, accuracy and uniformity of operation to provide an automatic means for presenting the sheets of paper to the printing mechanism, and of course this renders it essential that a magazine or holder be employed in which may be placed a quantity of paper and which will retain this paper in such position that the feed mechanism can withdraw individual sheets one at a time and pass them to the printing mechanism. The form of holder, as shown in the drawings, is admirably adapted for this purpose. It comprises two floors or bottoms 70 and 71 inclined or angularly related to each other and to the feed roll of the machine together with two vertical wings 72 which serve as side guides for the paper to direct it properly into the feed mechanism. The upper floor 70 is angularly adjustable with respect to the lower floor and to the feed mechanism in order to adapt the holder to different kinds of printable material; holes 74 being provided in the upper edge of the wings for the purpose of securing the floor 70 in any desired position. Both floors of the magazine are constructed on the principle of the well-known lazy-tongs and the wings are slidably mounted on a horizontally disposed plate 75 thus making the holder expansible or contractible laterally for the accommodation of different sizes of printable material. The plate 75 is supported upon the carriage 20.

Figure 17:
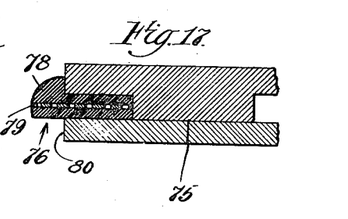
Fig. 17 is an enlarged sectional view of the ledge of the feed mechanism and of the restraining means associated therewith.

*The paper feed.*—I have previously stated that from the standpoint of uniformity, regularity and speed in a machine of this character it is essential that the paper be fed or passed to the printing mechanism with precision and at the proper time so that it will meet the type holder at the printing position and pass with it therethrough. In the feeder which I have provided the "first" sheet of paper is withdrawn from the holder but it is automatically withheld from moving into the printing position until the arrival of a type holder, the feed mechanism being so timed that when the type holder has arrived at substantially the printing position, the piece of paper will be released and carried forward to this position. While one sheet of paper is in transit from the holder to the printing position another sheet is given a preliminary or initial advance and placed in such a position that the moment the sheet in transit has passed, the initially advanced sheet will be carried down against the withholding means and held there pending the arrival of the next type holder. The edge of the plate 75 constitutes a ledge for receiving the paper and for holding it in position to be withdrawn from the holder, and this ledge is preferably provided with a number of restraining devices 76 held in position in a groove 77 formed in the edge of the plate 75. These restraining devices are preferably made of rubber, fiber or other comparatively soft material 78 molded or otherwise secured upon a metal reinforcing strip 79 and they are preferably of the conformation shown in Fig. 17. They are preferably made up in comparatively short lengths and disposed in a groove along the edge 80 of the plate 75. However, they may be adjusted along said slot to place them in any desirable position. It will be understood that if desired a single continuous restraining device occupying the entire groove may be substituted, depending upon the work in hand.

Rotatively mounted in the carriage frame 20, and disposed parallel and somewhat above the pressure roll, is a drawing roll or feed roll 81 driven in the same direction as the pressure roll by the intermeshing gears 82 which constitute the continued portion of the train of gears by which the pressure roll is driven. The feed roll is preferably of the same diameter and length as the pressure roll and is preferably mounted in the carriage in precisely the same manner, that is, it is held at one end by a spring-pressed center pin and at the other end by a shouldered head of a shaft 83, so as to be removable from the carriage in the same manner as the pressure roll. The feed roll is preferably made in the same form as the pressure roll with the exception that it is not divided and does not contain a separable platen, but it will be readily understood that it may be constructed in this manner if it is found desirable to do so. It is disposed parallel to and adjacent the edge of the plate 75 and coöperates with the restraining devices to pass the paper from the holder to the printing mechanism in a manner hereinafter described.

Figure 13:
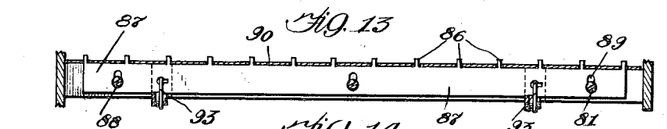
Figs. 13 and 14 are detail sectional views showing the stop and releasing dogs, taken on line 14—14 of Fig. 4.
Figure 14:
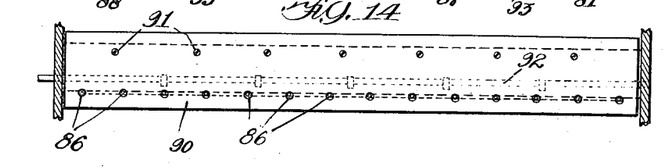
Figure 20:
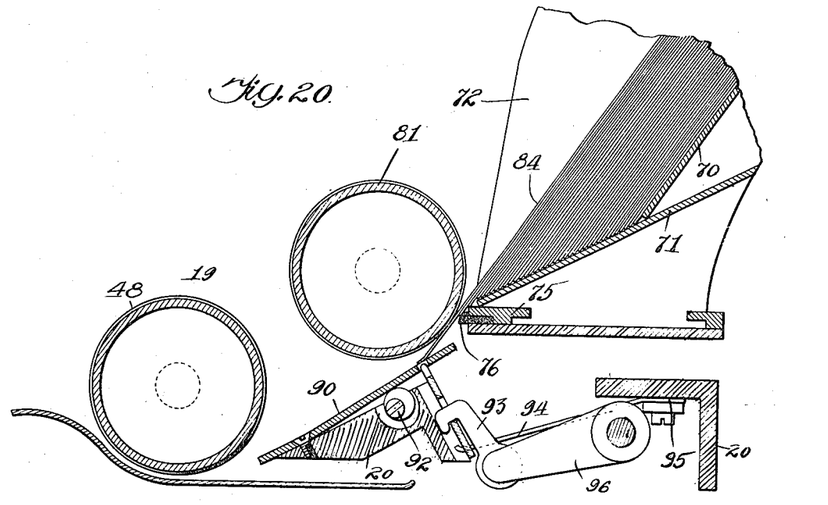
Figs. 20, 21, 22 and 23 are diagrammatic views of the feed and are intended to depict the various operating positions which the feed mechanism is in during the operation of the feed.
Figure 21:
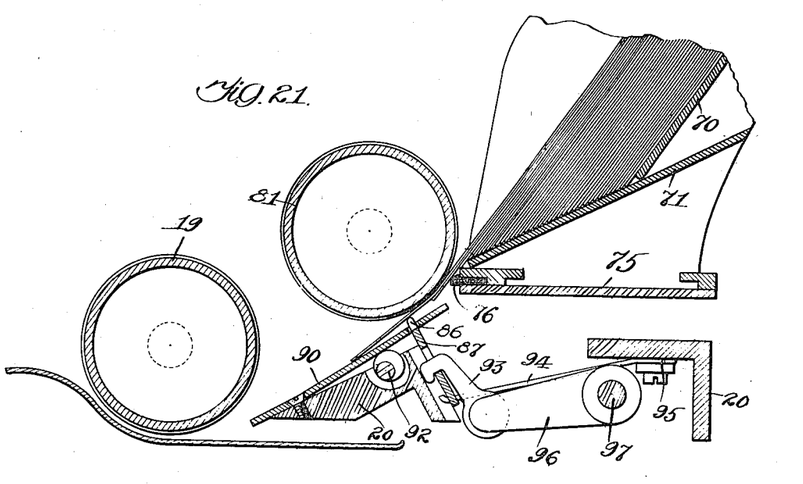
Figure 22:
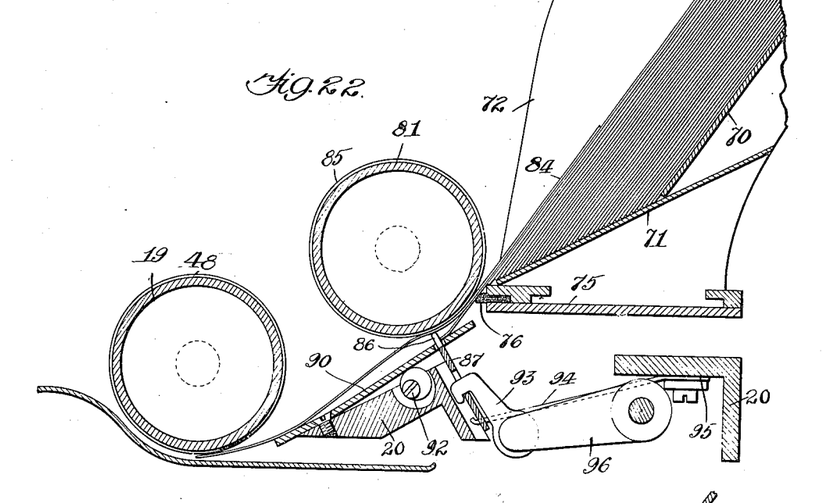
Figure 23:
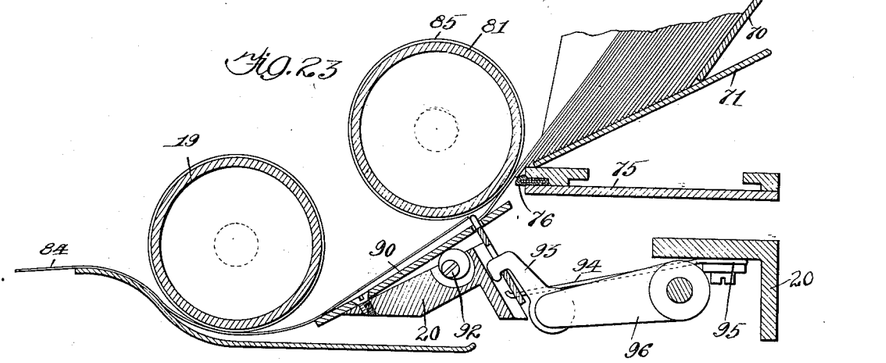

Referring now to Figs. 20, 21, 22 and 23, I will describe the manner in which the paper is fed to the printing mechanism: A pack of sheets of paper, envelops or other printable material is placed in the magazine and is preferably fanned out in a manner shown in said figures. The lower edges of the sheets of paper rest upon the floor of the magazine and since this floor is inclined they naturally tend to settle down toward the edge of the plate 75 which lies adjacent the feed roll 81. The "first" sheet 84 settles down into engagement with the surface of the feed roll, this roll being preferably provided with rubber bands 85 or other suitable friction surfaces disposed along its surface which will frictionally engage the sheet of paper to carry it on past the ledge and restraining devices. Now as the roll rotates it continually exercises a frictional engagement with the "first" sheet of paper and withdraws this sheet from the pack in the holder. Fig. 20 shows a "first" sheet just after having started and passed the restraining devices, and a "second" sheet, that is, the sheet immediately behind the "first" sheet, is resting with its edge on the restraining devices. As the "first" sheet continues its movement the "second" sheet is given a preliminary or initial advance which places it in position to be taken up by the feed roll as soon as the "first" sheet passes. The space between the restraining devices and the frictional surface of the roll is just sufficient to permit therein the first two sheets of paper. The roll engages the first sheet with considerable friction and moves it in a direction toward the feed mechanism. The restraining devices, however, offer a counter or reverse frictional resistance to the "second" sheet. The two sheets are in intimate contact, but the frictional resistance which said sheets offer to each other is considerably less than the retarding influence exerted by the restraining devices on the second sheet. This results in a relative difference in speed between the two sheets. While the effect of the resistance between the two sheets of paper is not sufficient to fully overcome the retarding influence of the restraining devices on the "second" sheet it is sufficient to cause the "second" sheet to move, this movement, however, being at a relatively slower speed than the "first" sheet. In other words, there is produced a differential speed between the two sheets of paper. The consequence is that the "first" sheet is caused to travel relatively faster than the "second" sheet. This condition is shown in Fig. 21 in which a "second" sheet is depicted as having initially advanced past the restraining devices. As soon as the upper edge of the first sheet has passed from between the roll and the restraining devices, it is evident that the second sheet will be free to move up into engagement with the surface of the roll and thereby become a "first" sheet, and the sheet immediately back of it takes the position of a "second" sheet. If there is nothing to prevent the further advance of the "second" sheet after the "first" sheet has passed, a continual stream of sheets of paper would be passed to the printing position, one sheet following directly in the trail of the other, or perhaps overlapping, and if this were the case the sheets of paper might or might not happen to arrive at the printing position simultaneously with the type holders. It is obvious then that some means should be provided for stopping or withholding the further advance of one sheet of paper after the other has passed, and that this stopping means be timed with the movement of the type holders and arranged to release a sheet of paper in time for it to reach the printing mechanism simultaneously with the arrival of a type holder. I have shown in the drawings one mechanism for performing this function. It comprises a plurality of stopping and releasing dogs 86 carried upon the edge of a strip or plate 87. (See Figs. 13 and 14). The plate, with its dogs, is positioned above the path of the type holders at the "intake" side of the printing mechanism and is disposed in proximity to and parallel with the feed roll. The dogs are adapted to move together toward the feed roll in time to catch and stop a "second" sheet of paper upon the initial advance thereof and to retract or move from the feed roll to release said sheet and allow it to pass on to the printing position at the proper time. The dog plate is arranged below the feed roll and moves substantially radially with respect thereto, its movement being limited by means of the pins 88. The pins 88 are secured to the carriage frame 20 and operate in slots 89 in said plate and serve to hold the plate upon the carriage frame and guide it in its movement. The dogs project through corresponding holes in a guide plate 90 mounted below the feed roll upon the carriage frame 20 in position to guide the paper into the printing mechanism. This plate is anchored by means of screws 91 adjacent one edge to the carriage frame 20 so that its other edge may be moved toward or from the feed roll, this movement being accomplished by a rotatable cam shaft 92 mounted in the frame 20. This arrangement provides a suitable adjustment of the guide plate for adapting it to various thicknesses of paper and particularly to comparatively heavy cards which need considerable room in which to bend while passing through the feed mechanism. A pair of hooks 93 engage with holes in the face of the dog plate 87 for pulling down or retracting the dogs, and a pair of spring members 94, anchored at 95 to another portion of the carriage frame 20, engages with notches 87' in the lower edge of the plate for imparting an upward movement to the dogs. The hooks are pivotally secured to the ends of rocker arms 96 carried upon a rock shaft 97 mounted in suitable journals in the carriage frame 20. (See Figs. 4 and 5).

Figure 15:
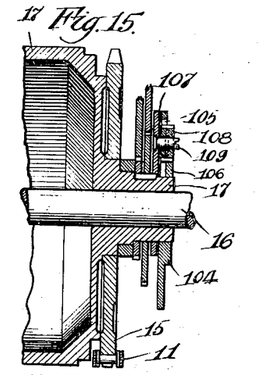
Fig. 15 is a sectional view on line 15—15 of Fig. 5.
Figure 16:
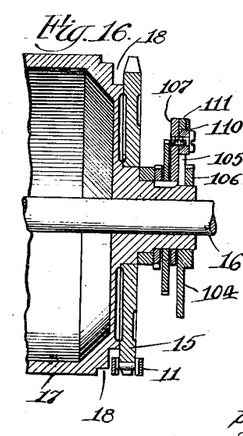
Fig. 16 is a sectional view on line 16—16 of Fig. 5.

The rock shaft carries a diagonally and downwardly extending arm 98. This arm carries at its lower end a flattened portion 99 which is engaged by an adjustment screw 100 carried in a threaded portion on the end of arm 101 of another bell crank lever. This other bell crank lever is pivotally mounted upon the shaft 63. It has another downwardly depending arm 102 which carries on its lower end a roller 103 which lies in the path of a cam member 104 mounted upon the drum shaft 16. This cam member is driven thereby through the agency of an adjustment device for positioning the cam at any point relatively to the drum. The cam member 104 has a curved slot opening 105 therein which occupies substantially half of said member. The inner edge of this opening is formed by a partially-toothed gear 106, disposed on the outer face of said cam member and rigidly secured to rotate therewith. On the other side of the cam member is a wide arm 107 secured to rotate with the shaft 16. Upon said arm is rotatably mounted a small pinion gear 108 meshing with the partial gear 106 and provided with a slot 109 into which a screw driver or other tool may be inserted to rotate the pinion. (See Figs. 5 and 15). By turning the pinion the cam member 104 may be rotated relatively to the shaft 16 to move its cam into any desired relation, with respect to the rotary drum, and, after having once been adjusted, the cam may be locked in position to rotate with the drum by means of a small screw clamp 110 which engages with the rim portion 111 of the cam member. (See Figs. 5 and 16). The rim portion is graduated or laid off to indicate the position of the cam with respect to the drum. This arrangement constitutes a means for timing the withdrawal and the forward movement of the stop and releasing dogs, as just described. The length of the cam surface determines the periods of action and inaction of the dogs and it will be understood that this may be made of any length desired to properly operate the dogs.

Returning again to the diagrams, (Figs. 20, 21, 22 and 23) I will explain the manner in which the stopping and releasing dogs control the movement of the paper. Fig. 20 depicts a condition in which the dogs have just been withdrawn and the "first" sheet of paper 84 is started through to the printing mechanism. A type holder at this time is also on its way to the printing mechanism and is a proportionate distance therefrom. The feed roll is now moving the "first" sheet along toward the printing mechanism, as shown in Fig. 21, and the dogs have almost reached their upward movement toward the feed roll to stop the "second" sheet. The differential speed between the "first" and "second" sheets of paper causes the "second" sheet to advance as previously stated, but the restraining devices retard this initial movement and hence the speed thereof is relatively slower than that of the "first" sheet, and the dogs return to their stopping or active position in time to block the movement of said "second" sheet, as clearly shown in Fig. 22. The "first" sheet continues on and passes the paper-holding ledge on its way to the printing mechanism. The dogs, however, retain or hold the "second" sheet (which has now become a "first" sheet) against further movement until it is about time for another type plate to arrive, this condition being shown in Fig. 23, and this condition exists until said sheet is released. Thus is readily seen the important function which the feed mechanism performs and its important relation to the rest of the printing machine. If the space between the feed roll and the restraining devices were fixed it is evident that only paper of a certain thickness and stiffness could be used in this machine; the machine, therefore, would be restricted to practically one kind of paper and different machines would be necessary for different kinds and thicknesses of paper. From this it is at once apparent what manifold advantages in the way of flexibility and range of adaptability of the machine may be obtained by arranging the restraining devices so that they may be relatively adjustable with respect to the feed roll. In order to make use of these advantages I have mounted the plate 75 and the restraining devices thereon so that they may be adjusted at different distances from the roll and at various angular positions with respect thereto, and thus render the feed mechanism adaptable to different kinds of work, such as letters, letter heads, envelops, cardboard and the like.

Figure 2:
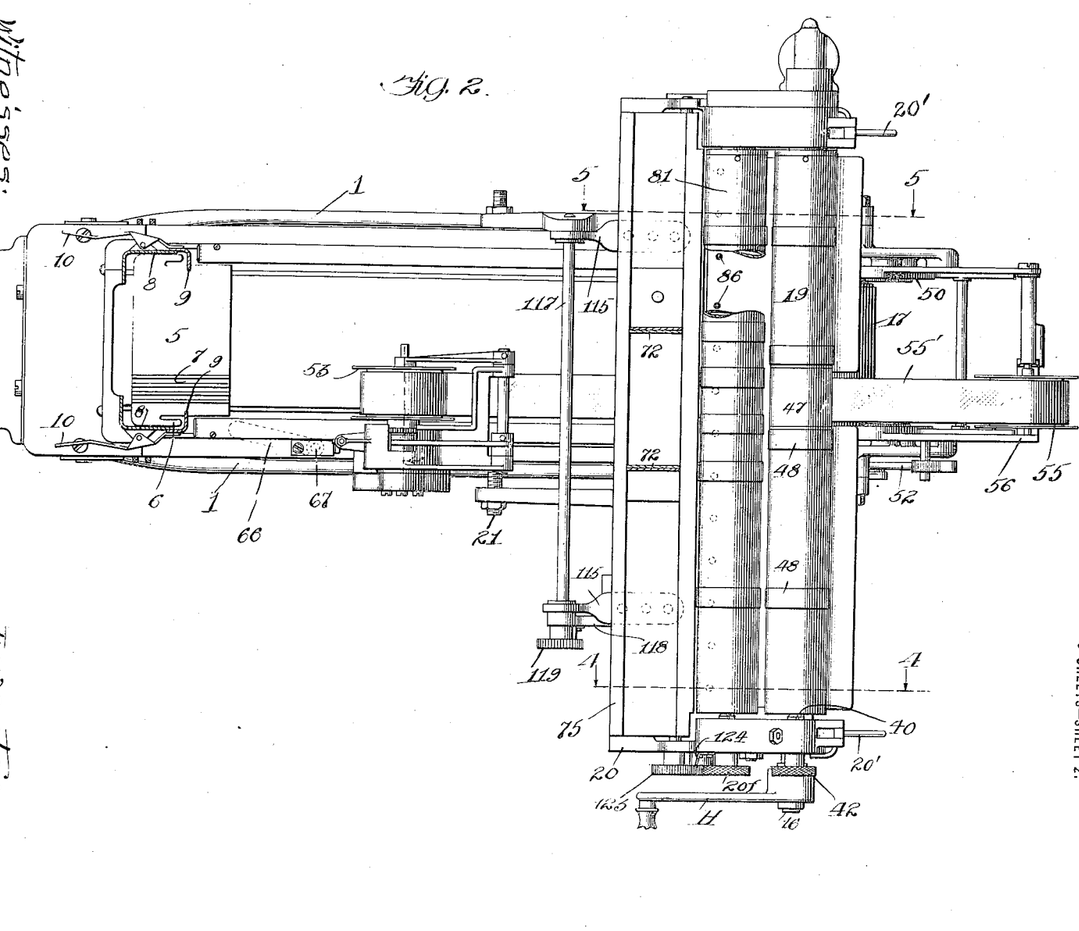
Fig. 2 is a top plan view of said machine.
Figure 3:
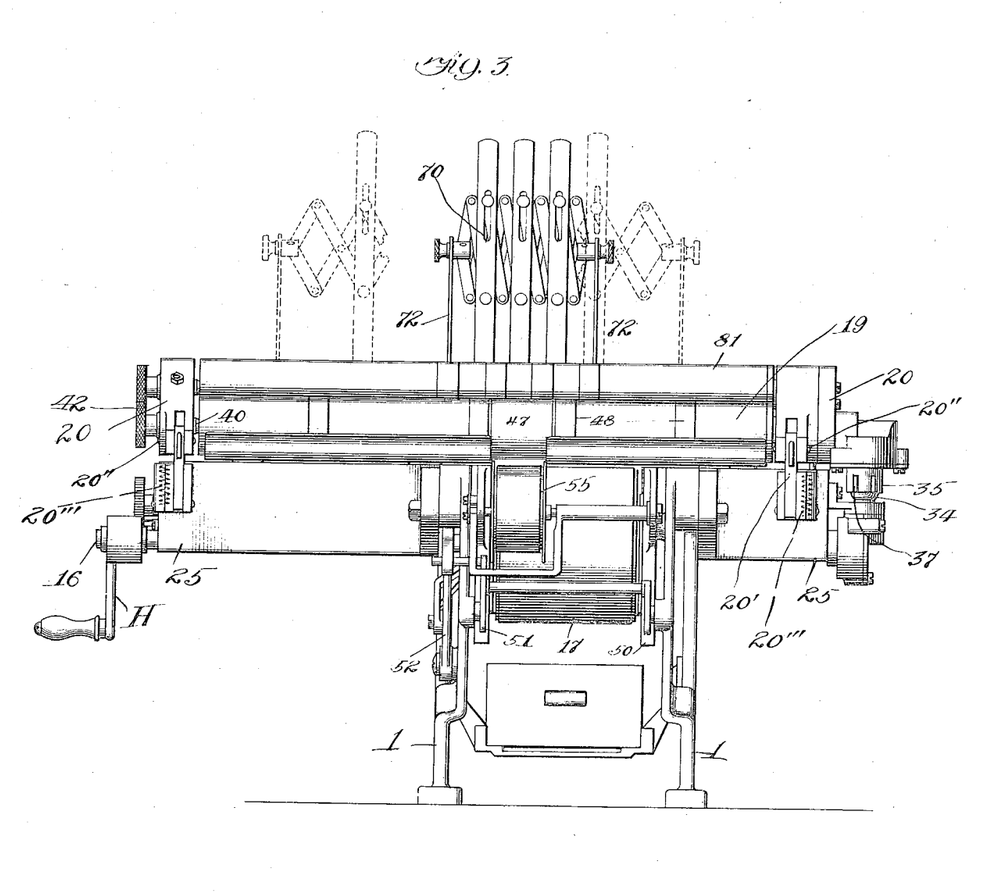
Fig. 3 is a front end elevation thereof.

By reference to Figs. 2 and 4 it will be seen that the plate 75 has two upwardly and rearwardly extending arms 115, in the upper ends of which are rotatably mounted a pair of cams 116 eccentrically arranged upon a shaft 117 which is journalled in two upstanding arms 118 of the carriage frame 20. One end of this shaft is provided with a knurled thumb-nut 119 by which the shaft may be conveniently rotated. Thus by rotating the shaft the plate 75, and consequently the restraining devices, may be made to assume various positions at different distances and different angles with respect to the feed roll. The forward portion of the plate 75 may be raised and lowered vertically to place the restraining devices at relatively different heights with respect to the feed roll by means of cams 120 eccentrically arranged upon a shaft 121 having suitable journal bearings in the carriage frame 20. This shaft is likewise provided on one of its ends with a knurled thumb-nut 123 by which the shaft may be rotated to raise or lower the restraining devices. Both knurled nuts 119 and 123 are graduated to indicate the degrees of adjustment, and each has a little spring locking piece 124 in engagement with its knurled edges to form a ratchet and to automatically lock the shafts in their adjusted position.

I claim:

1. In a printing machine a frame and a printing mechanism comprising a rotary drum and a pressure roll, a carriage in which said pressure roll is mounted and maintained in relative position above said drum, said carriage being adapted to be raised or lowered to separate the pressure roll and drum, means for locking said carriage in position, means for raising and lowering said carriage to adjust the pressure roll relatively to the rotary drum, and automatic paper feed mechanism positioned on and movable with said carriage at the "intake" side of said printing mechanism.

2. In a printing machine a frame and a printing mechanism supported therein comprising a rotary drum, a carriage, a pressure roll mounted in said carriage and maintained in relative position above said drum, said carriage being adapted to be raised and lowered to separate the pressure roll and drum, means for locking said carriage in position, means for raising and lowering said carriage and the pressure roll relatively to the rotary drum, and automatic feed mechanism positioned on and movable with said carriage at the "intake" side of said printing mechanism.

3. In a printing machine a frame and a printing mechanism supported therein comprising a rotary drum, a carriage, a pressure roll mounted in said carriage and maintained in relative position above said drum, said carriage being swingable relatively to said frame to separate and to relatively adjust the pressure roll and drum and an adjustable automatic feed mechanism positioned on and movable with said carriage at the "intake" side of said printing mechanism for periodically feeding pieces of printable material to said printing mechanism.

4. In a printing machine a frame and a rotary drum supported therein, a swingable carriage bridging the upper portion of said frame, a pressure roll rotatably mounted in said carriage and positioned above the rotary drum, spring tension members locking said carriage in position, and means for raising and lowering said carriage against the tension of said spring members to relatively adjust the pressure roll with respect to said drum.

5. In a printing machine a frame and a rotary drum supported therein, a swingable carriage bridging the upper portion of said frame, a pressure roll rotatably mounted in said carriage and positioned above the rotary drum, spring tension members locking said carriage in position and cam operated jack pins for raising and lowering said carriage against the tension of said spring members to vary the space between said pressure roll and said drum.

6. In a printing machine, the combination with a printing mechanism, including a rotating drum, of a paper holding ledge, rotary drawing means disposed adjacent said ledge and spaced therefrom a distance sufficient to allow two sheets of paper to pass therebetween, means for arresting the lower sheet after it has advanced a substantial distance between said ledge and drawing means, while allowing the upper sheet to continue, and means including an adjustable cam for controlling said arresting means to permit the advance of the arrested sheet after a predetermined interval.

7. In a printing machine, the combination with a printing mechanism, including a rotating drum, of a paper holding ledge, rotary drawing means disposed adjacent said ledge, means spaced from said ledge and drawing means and movable into the path of a sheet of paper to arrest it after it has advanced a substantial distance between said ledge and drawing means, and means for controlling said arresting means to permit the advance of the arrested sheet after a predetermined interval.

8. In a printing machine, the combination with a printing mechanism including a rotating drum, of a paper-holding ledge above said drum, a drawing roll adjacent to said ledge, restraining means associated with said ledge and coöperating with said roll to cause the initial advance of a "second" piece of paper while a "first" piece is in transit, means for delaying a further advance of the second piece of paper and for releasing it and means for automatically controlling said delaying means to allow the advance of said "second" piece of paper after a predetermined interval.

9. In a printing machine, the combination with a printing mechanism including a rotating drum, of a drawing roll and a paper-holding ledge having means thereon to coöperate with said roll to frictionally move the first two sheets of paper at relatively different speeds, and stopping and releasing dogs having a period of action wherein they stop the movement of the sheet having the slower speed after it has advanced a substantial distance and having a period of inaction wherein they permit the advance of said sheet to printing position.

10. In a printing machine, the combination with a printing mechanism including a rotary drum, of a drawing roll and a paper-holding ledge and means thereon to coöperate with said roll to frictionally move the first two sheets of paper at relatively different speeds, and stopping and releasing dogs having a period of action wherein they stop the movement of the sheet having the slower speed after it has advanced a substantial distance and having a period of inaction wherein they permit the advance of said sheet, and adjustable timing mechanism for relatively varying the periods of action and inaction to determine the position of the imprint upon the paper.

11. In a printing machine, the combination with a printing mechanism including a rotating drum, of a coöperating drawing roll and adjustable paper-holding ledge for frictionally advancing the "first" and "second" sheets of paper, restraining means associated with said ledge for frictionally retarding the second sheet, and mechanism timed to stop said second sheet after it has advanced a substantial distance while the first sheet is in transit and for releasing said second sheet at a predetermined time.

12. In a printing machine, the combination with a printing mechanism including a rotating drum, of a paper-holding ledge, a coöperating drawing roll, means on said ledge to coöperate with said roll to frictionally advance the first and second sheets of paper at relatively different speeds, stopping and releasing dogs operable toward and away from the drawing roll for withholding the second sheet for a predetermined interval after it has advanced a substantial distance, and an adjustable guide for directing the paper into printing position.

13. In a printing machine, the combination with a printing mechanism including a rotary drum, of a paper-holding ledge, a coöperating drawing roll, means on said ledge to coöperate with said roll to advance the "first" and "second" sheets of paper at relatively different speeds, stopping and releasing dogs operable toward and from said drawing roll for controlling the movement of said paper, a system of levers and an operating cam therefor timed to retract said dogs to release the first sheet and immediately advance said dogs to stop the second sheet.

14. In a printing machine, the combination with a frame, of a printing mechanism carried at the forward end of said frame including a rotating drum, a carriage hinged on said frame, a platen mounted in said carriage, a rotating drawing roll mounted in said carriage for advancing the sheets of paper to a position beneath said platen, a gear mechanism for driving said drawing roll and platen and a gear mechanism for driving said drum, and a separable driving connection between said first-mentioned gear mechanism and second-mentioned gear mechanism to permit said carriage to be swung upon its pivot.

15. In a printing machine, the combination with a supporting frame, a rotary drum at the forward end of said frame, a carriage pivoted upon and bridging the upper portion of said frame, a platen roll removably mounted in said carriage and disposed above the drum, an automatic paper-feeding mechanism also mounted on said carriage frame, a train of gears for driving said platen and paper-feeding mechanism and a second train of gears for driving said drum, and a separable driving clutch interposed between said two trains of gears to permit said carriage to be swung on its pivot.

16. In a printing machine, the combination with a printing mechanism including a rotary drum, of a paper-holding ledge, a frictional drawing roll adjacent thereto and spaced therefrom a distance sufficient to permit two sheets of paper between the roll and the ledge, said roll being adapted to frictionally engage a first sheet of paper to withdraw it from said ledge, said first piece of paper being adapted to frictionally withdraw a second piece of paper from said ledge, retarding means associated with said ledge for frictionally resisting the speed of said second sheet, and mechanism associated with said roll and ledge timed to withhold the second sheet against movement for a predetermined period after it has advanced a substantial distance, said ledge being adjustable to vary the space and angular relations with respect to the roll to adapt the feeding of paper having different characteristics.

17. In a printing machine, a rotary printing mechanism comprising a drum and a sectional pressure roll disposed above and axially parallel to said drum, a platen carried by said pressure roll, the sections of said roll being interlocked to cause them to rotate together and separable to permit the removal of said platen.

18. A platen roll for printing machines comprising two cylindrical sections separably joined end to end, a tubular platen member fitting the end of one of the sections and held in position by the abutting end of the other section.

19. A platen roll for printing machines consisting of two tubular sections separably joined end to end in axial alinement, one of said sections being reduced in diameter adjacent its abutting end, and a removable tubular platen member fitting said reduced portion having its surface substantially flush with the surface of the roll, said member being held in position by the abutting end of the other section.

20. A platen roll for printing machines having a portion thereof reduced in diameter, a removable platen member fitting said reduced portion and having its surface substantially flush with the surface of the roll, said roll being separable into two parts to permit the removal of said platen member, and circumferential frictional bands disposed at intervals along said roll.

21. In a device of the character described, the combination with a supporting frame, of a rotary type plate bed arranged within said frame, mechanism for delivering type plates to said bed, a second frame hingedly mounted on said first frame, and a paper feeder mounted on said second frame and movable therewith, whereby said paper feeder may be raised to permit access to the type plate bed and mechanism within the frame.

22. In a device of the character described, the combination with a frame, of a shaft mounted therein, a rotary type plate bed mounted on said shaft, a second frame hingedly mounted on and above said first frame, a paper feeder mounted on said second frame and comprising a paper holder and a rotary frictional drawing roll, and a separable driving connection between said shaft and said driving roll whereby the paper feeder may be raised to permit access to the type plate bed and mechanism contained in said first mentioned frame.

23. In a device of the character described, the combination with a frame, of a rotary type plate bed mounted within said frame, mechanism for delivering type plates to said bed arranged within said frame, a second frame hingedly mounted on said first frame, a rotary pressure platen mounted in said second frame, a paper feeder mounted in said frame and comprising a paper holder and frictional drawing roll for drawing the paper from said holder and delivering the same to said pressure platen, a driving mechanism arranged within said first mentioned frame, a driving mechanism for said platen, and a separable connection between said mechanisms.

24. In a device of the character described, the combination with a frame, of a shaft rotatably mounted therein, a type plate bed mounted on said shaft, a type plate delivering mechanism for delivering type plates to said bed driven from said shaft, a second frame hingedly mounted on said first frame, a rotary pressure platen mounted in said second frame, a paper feeder mounted in said second frame and comprising a paper holder and a frictional drawing roll, and a separable connection between said shaft and driving mechanism.

25. In a device of the character described, the combination with a main frame, of a shaft mounted in said frame, a type plate bed mounted on said shaft, a paper feeder comprising a paper holder and frictional drawing roll, intermittently operated timing stops adapted to move into the path of the paper at a substantial distance from said holder and roll for controlling the delivery of the sheets of paper, mechanism for operating said timing stops arranged within said main frame and operated from said shaft, and a separable connection between said stop operating mechanism and said stops.

26. In a device of the character described, the combination with a main frame, of a rotary type plate bed mounted therein, a second frame hingedly mounted on said main frame, a pressure platen mounted in said hinged frame, that portion of the frame carrying said platen being adjustable relatively to the type plate bed to vary the pressure of the platen, and means for locking said hingedly mounted frame in its adjusted position.

27. In a device of the character described, the combination with a main frame, of a shaft mounted in said main frame, a type plate bed mounted in said shaft, a second frame hingedly mounted on said first mentioned frame, a paper feeder mounted in said second frame and comprising a paper holder and a frictional drawing roll, and intermittently operated stops for timing the delivery of the timing mechanism arranged within said main frame and driven from said shaft, means for regulating the operation of said mechanism to control the delivery of the paper relatively to the type plate also arranged within said main frame, and a separable connection between said stop operating mechanism and said stops.

28. In a device of the character described, the combination with a main frame comprising side members and a bed member arranged between such side members, of a rotatable type plate bed mounted between said side members at the end of said bed and having its periphery operating in substantially the same plane as said bed, a second frame hingedly mounted on said first frame above said bed, a pressure platen mounted in said second frame above said type plate bed, and a paper feeder mounted on said hinged frame for delivering single sheets of paper beneath said platen.

In testimony whereof, I have hereunto set my hand, this 29th day of June, 1910, in the presence of two subscribing witnesses.

DAVYDD C. HUGHES.

Witnesses:
M. SIMON,
EDGAR F. BEAUBIEN.